(12) United States Patent
Craig et al.

(10) Patent No.: US 9,004,492 B2
(45) Date of Patent: Apr. 14, 2015

(54) SHROUDED FACE SEAL AND COMPONENTS THEREOF

(75) Inventors: Colin D. Craig, West Hartford, CT (US); Enzo Dibenedetto, Torrington, CT (US); Christopher P. Kmetz, Amston, CT (US); Jonathan L. Miller, East Hampton, CT (US); Mark R. Sondeen, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 771 days.

(21) Appl. No.: 12/826,629

(22) Filed: Jun. 29, 2010

(65) Prior Publication Data

US 2010/0264601 A1  Oct. 21, 2010

Related U.S. Application Data

(62) Division of application No. 11/266,454, filed on Nov. 3, 2005, now Pat. No. 7,837,199.

(51) Int. Cl.
  *F16J 15/00* (2006.01)
  *F16J 15/34* (2006.01)
  *F01D 11/00* (2006.01)

(52) U.S. Cl.
  CPC .......... *F16J 15/3468* (2013.01); *F01D 11/003* (2013.01); *F05D 2240/55* (2013.01)

(58) Field of Classification Search
  USPC .......................... 277/370, 372, 373, 375, 377
  See application file for complete search history.

(56) References Cited

U.S. PATENT DOCUMENTS

| | | | |
|---|---|---|---|
| 2,554,406 | A | 5/1951 | Hastings et al. |
| 2,592,728 | A | 4/1952 | Payne |
| 2,882,076 | A | 4/1959 | Laser et al. |
| 3,024,048 | A | 3/1962 | Kobert |
| 3,356,377 | A | 12/1967 | Voitik |
| 3,784,213 | A | 1/1974 | Voitik |
| 3,841,642 | A | 10/1974 | Kirker, Jr. |
| 4,063,741 | A | 12/1977 | Kerr |
| 4,294,453 | A | 10/1981 | Inouye et al. |

(Continued)

FOREIGN PATENT DOCUMENTS

| | | |
|---|---|---|
| DE | 29908918 | 10/1996 |
| EP | 1010926 | 6/2000 |

(Continued)

OTHER PUBLICATIONS

Pratt & Whitney Gas Turbine Seminar vol. 1, pp. 15-585A and 15-606 through 15-612 (1990).

(Continued)

*Primary Examiner* — Gilbert Lee
(74) *Attorney, Agent, or Firm* — Carlson, Gaskey & Olds, P.C.

(57) ABSTRACT

One embodiment of the face seal described herein includes a seal seat and a seal element carried by a seal housing. The seal element cooperates with the seal seat to establish a seal. The housing includes a seal element support and a shroud. The seal housing is made of a parent material and the shroud has a tip impregnated with a second material.

15 Claims, 4 Drawing Sheets

(56) References Cited

U.S. PATENT DOCUMENTS

| | | |
|---|---|---|
| 4,600,318 A | 7/1986 | Miller |
| 4,715,260 A * | 12/1987 | Pribis et al. ............ 89/7 |
| 4,768,790 A | 9/1988 | Netzel et al. |
| 5,464,227 A | 11/1995 | Olson |
| 5,567,132 A | 10/1996 | Dupuis et al. |
| 5,658,127 A | 8/1997 | Bond et al. |
| 6,132,168 A | 10/2000 | Kovaleski et al. |
| 6,213,472 B1 | 4/2001 | Bondarenko et al. |
| 6,425,583 B1 | 7/2002 | Muraki |
| 6,814,355 B2 * | 11/2004 | Bjornson ............ 277/358 |

FOREIGN PATENT DOCUMENTS

| | | |
|---|---|---|
| EP | 1577591 | 9/2005 |
| EP | 1600673 | 11/2005 |

OTHER PUBLICATIONS

Pratt & Whitney "prior art" Carbon Element.
European Search Report dated Jul. 1, 2010.

* cited by examiner

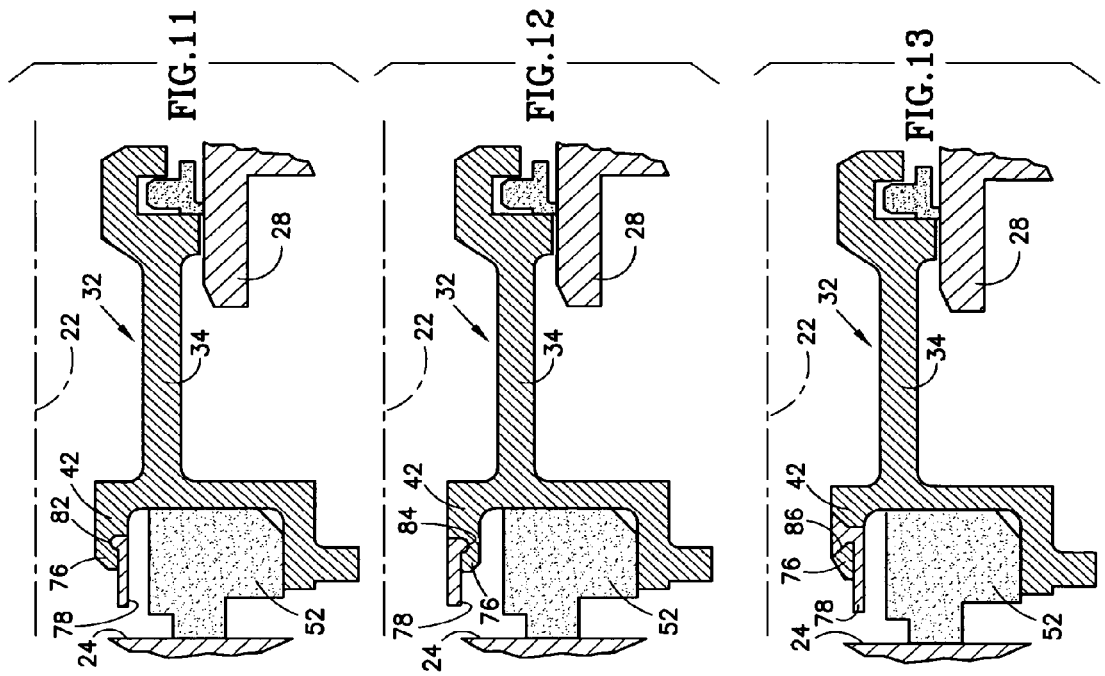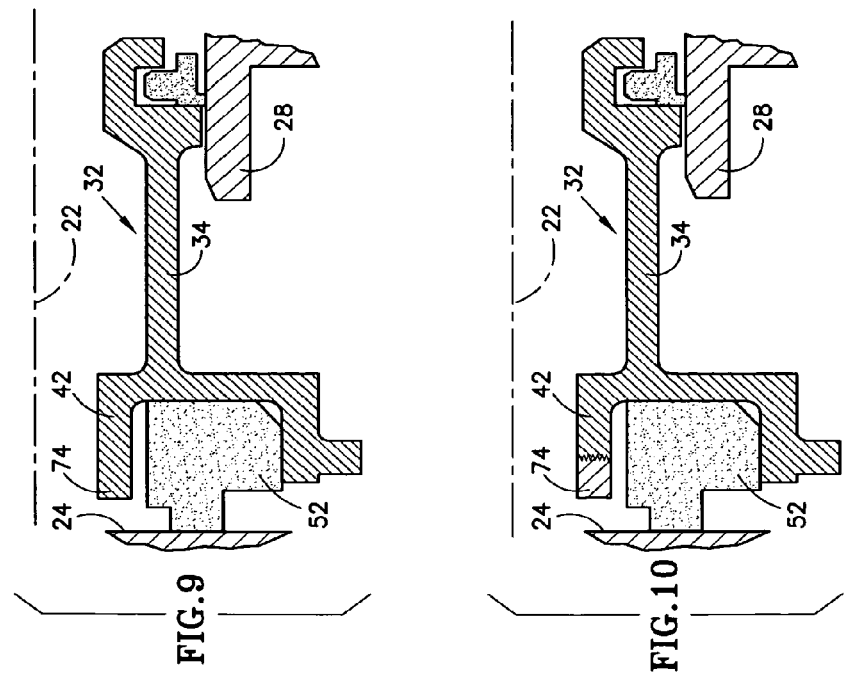

SHROUDED FACE SEAL AND COMPONENTS THEREOF

CROSS-REFERENCE TO RELATED APPLICATIONS

This disclosure is a divisional of U.S. application Ser. No. 11/266,454, which was filed on 11 Nov. 2005 and is incorporated herein by reference.

TECHNICAL FIELD

This disclosure relates to face seals and particularly to a carbon face seal whose performance deteriorates in a relatively benign way in comparison to conventional seals.

BACKGROUND

Carbon face seals are used in machinery, such as turbine engines, to effect a fluid seal between regions of high and low fluid pressure. For example, carbon seals are used to prevent hot, high pressure air from entering a bearing compartment operating at a lower pressure. A typical carbon seal for a turbine engine includes an annular carbon ring secured to an annular, nonrotatable, axially translatable seal housing. The seal also includes a seal seat affixed to a rotatable shaft and positioned axially adjacent to the carbon ring. The carbon ring comprises a base (or blank) and a nose projecting axially from the base. The nose is urged into contact with the seal seat by a combination of spring forces acting on the seal housing and the net resultant of axially opposing fluid pressure forces acting on the seal housing and the carbon ring. The contact area between the carbon ring and the seal seat equals the annular area of the nose. The contact between the nose and the seal seat resists fluid leakage across the seal in the radial direction, i.e. toward or away from the axis of rotation of the seal seat.

During operation, the nose gradually wears away. Ordinarily, the seal is replaced or refurbished before the nose is completely worn away. Occasionally, however, accelerated seal wear can result in complete wear of the nose so that the base of the carbon ring contacts the seal seat. As a result, the contact area between the carbon ring and the seal seat equals the annular area of the base, which is larger than the contact area of the nose. This affects the resultant of the axially opposing fluid pressure forces such that the net pressure force is less favorable for maintaining reliable, positive contact between the carbon ring and the seal seat. Unfortunately, the transition between the normal condition in which the nose contacts the seal seat, and the highly deteriorated condition in which the base contacts the seal seat, although it occurs very infrequently, can occur with little warning. In addition, more abrupt failure or deterioration of the carbon ring can have a similar adverse effect on the resultant of the fluid pressure forces. As a result there may be an unanticipated period of engine operation during which fluid leaks past the seal What is needed is a carbon seal that deteriorates gracefully in order to exhibit a detectable and benign operating characteristic that clearly indicates that maintenance is required.

SUMMARY

One embodiment of the face seal described herein includes a seal seat and a seal element carried by a seal housing. The seal element cooperates with the seal seat to establish a seal. The housing includes a seal element support and a shroud. The seal housing is made of a parent material and the shroud has a tip impregnated with a second material.

Another seal element embodiment includes a blank configured to be held by seal housing. A nose extends from the blank toward a seal face in a given direction. A first region of the blank extends in the given direction beyond a second region of the blank. The first and second regions are on radially opposite sides of the nose. The nose and the first region extend in the given direction past the seal housing.

Yet another example seal element embodiment for a face seal includes a blank configured to be held by seal housing. A nose extends from the blank toward a seal face in a given direction. A first region of the blank extends in the given direction beyond a second region of the blank. The first and second regions are on radially opposite sides of the nose. The nose extends in the given direction past the first region to define a step past the seal housing.

The foregoing and other features of the various embodiments of the disclosed seal will become more apparent from the following detailed description and the accompanying drawings.

BRIEF DESCRIPTION OF THE DRAWINGS

FIG. 9 is a view illustrating a seal housing with a shroud whose tip is made of the same material as the rest of the seal housing.

FIG. 10 is a view similar to FIG. 9 showing a seal housing made of a parent material and having a shroud with a bonded or impregnated tip made of a second material.

FIGS. 11-13 are views similar to FIG. 9 but with a shroud having a tip in the form of an insert or attachment.

DETAILED DESCRIPTION

Figure 1:
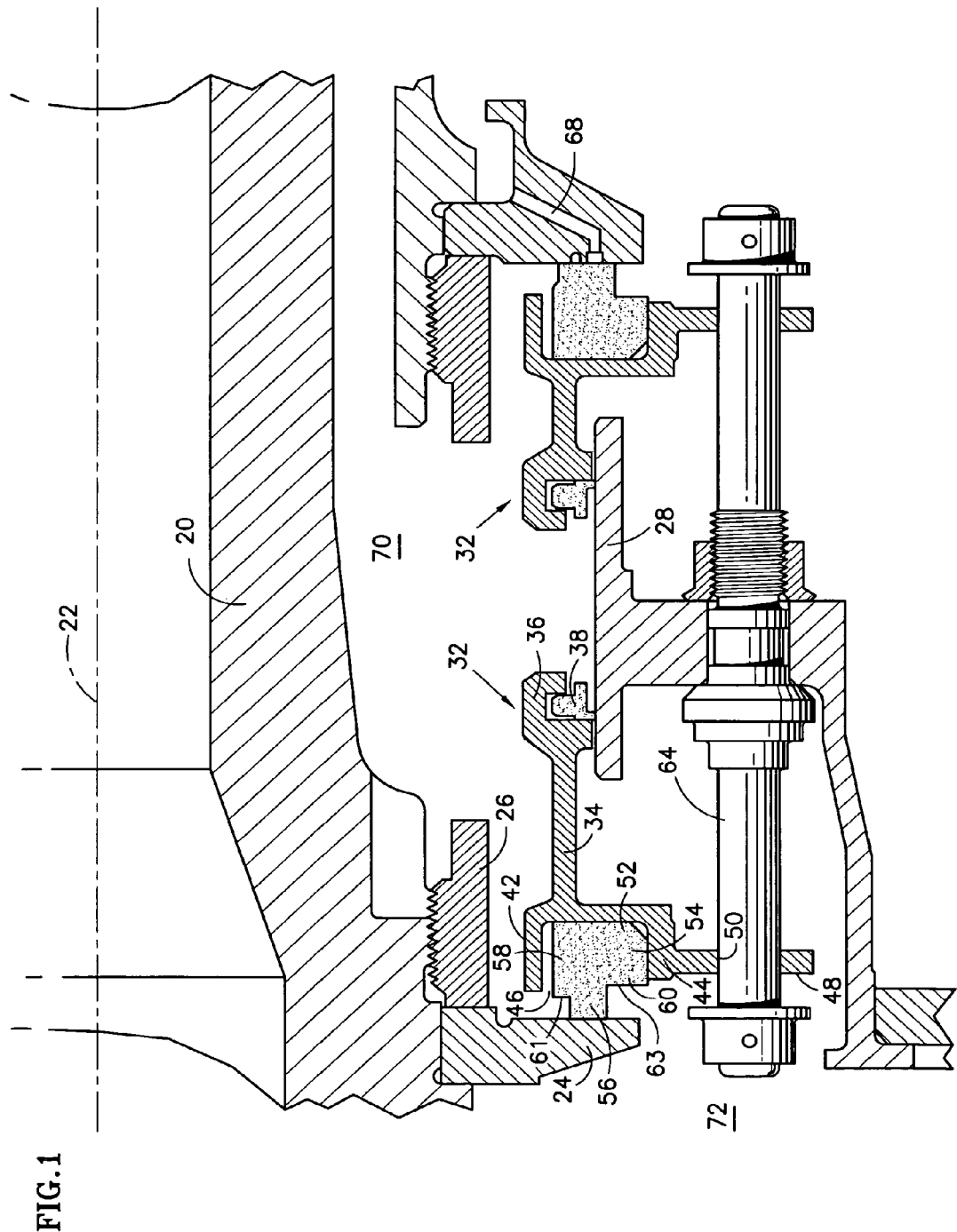
FIG. 1 is a cross sectional side elevation view showing an improved carbon seal.

Referring to FIG. 1, a shaft 20 for a rotary machine, such as a turbine engine, is rotatable about an axis 22. A seal seat in the form of an annular ring 24 is secured against a shoulder on the shaft by a nut 26. The seal seat extends radially outwardly from the shaft and circumscribes the axis. The seal seat is one component of a face seal assembly.

The face seal assembly also includes an annular, nonrotatable seal support 28 and a pair of annular seal housings 32. Each seal housing includes a base 34 and a grooved secondary seal holder 36 at one end of the base. The secondary seal holder holds a secondary seal 38 in contact with a cylindrical bore of the seal support. The other end of the seal housing includes an axially extending shroud 42 and an axially extending support lip 44 that serves as a seal element support. The shroud 42 is radially offset from the lip 44 to define an annular space 46 for receiving a seal element. The shroud is also axially elongated relative to the lip. An annular flange 48 with circumferentially distributed slots 50 projects radially outwardly from the lip 44.

The face seal assembly also includes a seal element 52 residing in the space 46 and secured to the lip 44 by an interference fit. The seal element includes a base or blank 54 and a nose 56 extending axially from the blank. The blank is double stepped such that a first, radially inboard region 58 of the blank extends axially beyond a second radially outboard region 60 of the blank to define a first or radially inner step 61 and a second or radially outer step 63. Moreover, inner step 61 resides axially beyond the tip of shroud 42 whereas outer step 63 does not reside axially beyond the shroud tip. In other words, the tip of the shroud is axially between the steps 61, 63. The seal element is typically made of a graphitic carbon material and is often referred to as a carbon element even though it is not made of pure carbon. In the illustrated application, the carbon element is annular and therefore can be referred to as a carbon ring.

A set of circumferentially distributed support pins such as representative pin 64, each projects axially from the seal support 28 and passes through a corresponding slot 50 in the flange 48. Springs 66 (depicted in FIGS. 5-8) are circumferentially offset from the pins 64. The springs are compressed between the flange 48 of housing 32 and the support 28 so that they exert a force on the flange 48 to urge the nose of the carbon ring into contact with the seal seat 24. The interface between the nose and the seal seat may be unlubricated or "dry" as seen at the left side of the illustration, or it may be lubricated or "wet" as seen at the right side of the illustration. In a wet seal, lubricant flows to the interface by way of circumferentially distributed lubricant passages 68 in the seal seat.

During engine operation, high pressure air is present in the annular cavity 70 radially inboard of the seal and radially outboard of the shaft 20. Lower pressure air intermixed with oil occupies a bearing compartment 72, which is the region outboard of the seal. The seal resists leakage of the higher pressure air into the lower pressure bearing compartment.

Figure 2:
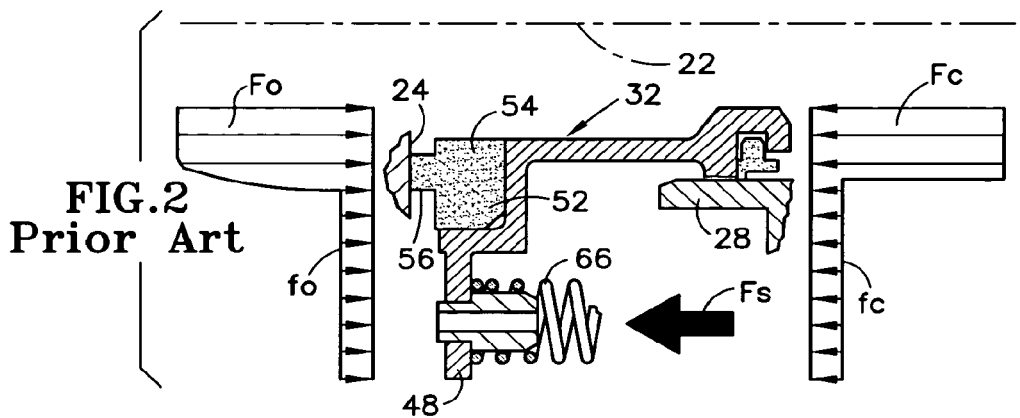
FIGS. 2, 3 and 4 are schematic views similar to FIG. 1, but circumferentially offset from FIG. 1, showing fluid pressure forces acting on a traditional seal in a normal or normally deteriorated condition, a highly deteriorated condition and a damaged or severely degraded condition respectively.

Referring additionally to FIG. 2, the operation of the above described shrouded seal is best understood by first considering a conventional seal. FIG. 2 shows the conventional seal in a normal or substantially undeteriorated condition. FIG. 2 also suffices to show the seal in a normally deteriorated condition, i.e. with the nose only partially worn away. The arrow $F_c$ represents the force exerted on the seal housing 32 by the springs 66. Force graphs $F_o$ and $F_c$ show the axially opposing, radially distributed forces $F_o$ and $F_c$ acting on the seal housing, carbon ring and secondary seal as result of the disparate pressures in cavity 70 and compartment 72. The force vectors in graphs $F_o$ and $F_c$ are illustrated as terminating on respective common planes to facilitate comparisons of the aggregate pneumatic forces. However those skilled in the art will recognize that the forces actually act on the axially facing surfaces of the seal housing, carbon ring and secondary seal. Graph $F_c$ shows a relatively high pressure acting on the high pressure side of the seal and a low pressure acting on the low pressure side of the seal. Graph $F_o$ shows high pressure acting on the high pressure side of the seal, low pressure acting on the low pressure side of the seal, and a radially varying pressure in a transition region across the nose 56 of the carbon ring. As is evident, the nose throttles the high pressure down to the low pressure across a narrow radial region. The combination of $F_s$ and $F_c$ exceeds $F_o$ to keep the seal closed.

Figure 3:
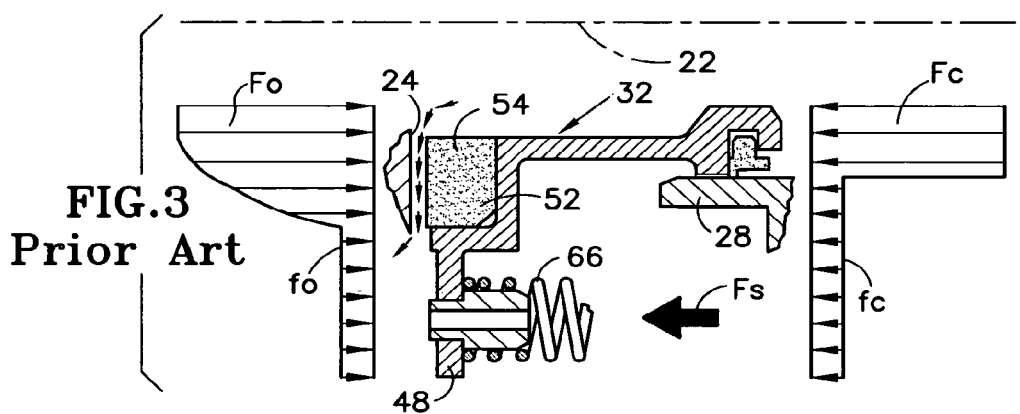
Figure 4:
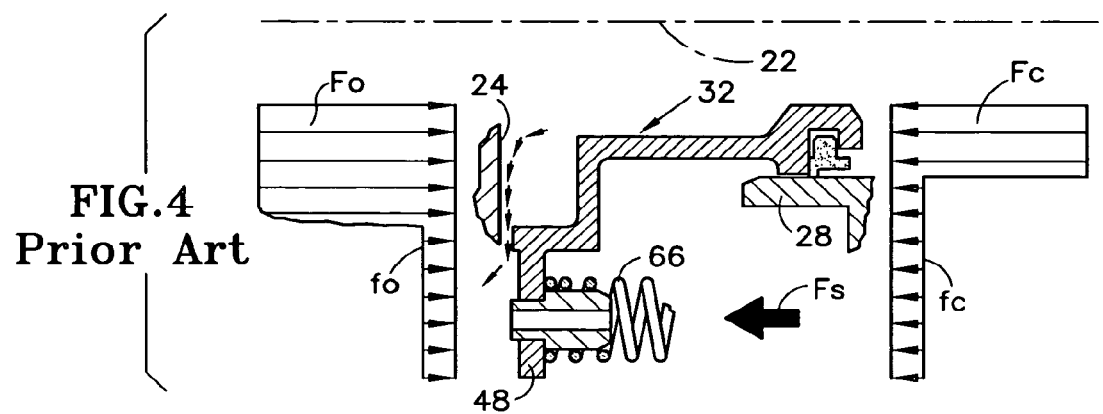

FIG. 3 shows the conventional seal in a highly deteriorated condition in which the nose has been entirely worn away. $F_c$ is the same as in FIG. 2. However because the nose has been worn away, the base portion 54 of the carbon ring throttles the high pressure down to the low pressure across a radial transition region that is relatively wide in comparison to the transition region of FIG. 2. As a result higher pressure, and therefore higher forces, act over a larger radial region than is the case in FIG. 2. Accordingly, the aggregate force $F_o$ acting on the highly deteriorated seal of FIG. 3 exceeds the aggregate force $F_o$ acting on the normal or normally deteriorated seal of FIG. 2. Furthermore, $F_s$ is slightly smaller than it is in FIG. 2 due to the increased spring elongation (decompression) and consequent reduction in spring force. Due to the change in forces acting on the seal, there is a potential for $F_o$ to exceed the combination of $F_s$ and $F_c$ resulting in separation of the carbon ring 52 from the seal seat 24. This separation will allow leakage through the resulting gap as indicated by the small fluid flow arrows. The force graphs and forces would be as shown in FIG. 4 if the carbon ring were broken away along part or all of its circumference. This would also result in the potential for leakage as indicated in FIG. 4.

As mentioned previously, the transition between the normal condition in which the nose contacts the seal seat, and the highly deteriorated condition or severely deteriorated conditions occurs very infrequently, but can occur with little warning. As a result there may be an unanticipated period of engine operation during which fluid leaks past the seal.

Figure 5:
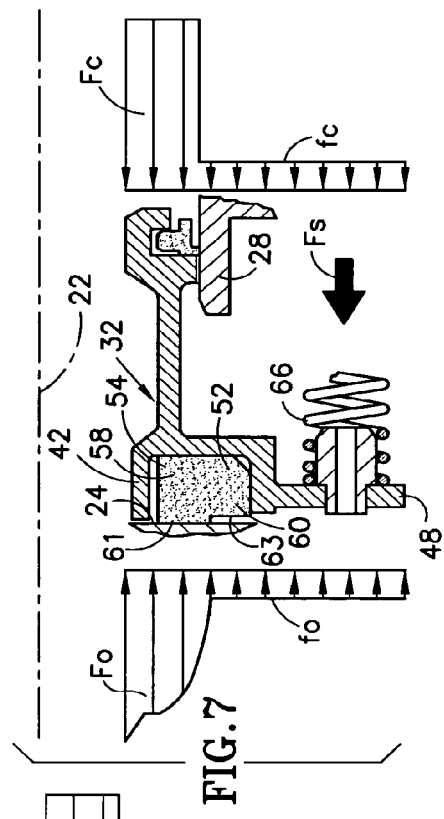
FIGS. 5-8 are schematic views similar to FIGS. 2 through 4 showing fluid pressure forces acting on an improved seal in normal, highly deteriorated, severely deteriorated and damaged conditions respectively.

FIG. 5 corresponds to FIG. 2, but shows the improved, double stepped shrouded seal in an undeteriorated or normally deteriorated condition. As is evident, the forces are substantially the same as those of FIG. 2, with the result that the seal is urged closed.

Figure 6:
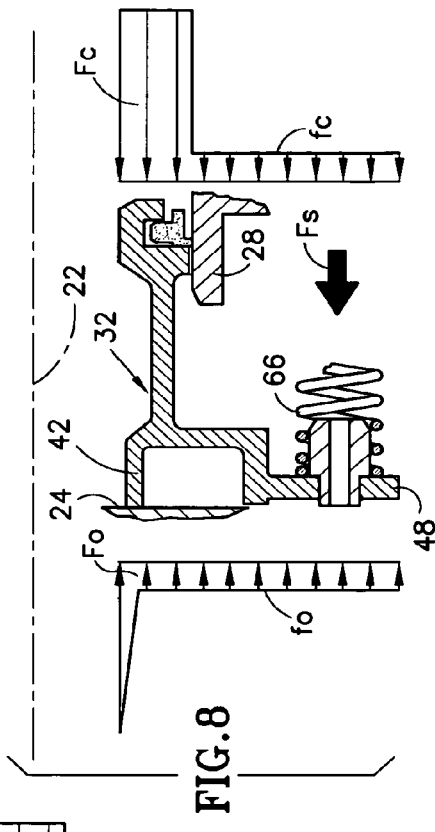

FIG. 6 shows the improved, double stepped shrouded seal in a highly deteriorated condition similar to the condition of the conventional seal in FIG. 3. The blank of the carbon ring of FIG. 6 includes the first radial region 58 and its associated step 61 extending axially beyond the second radial region 60 and its associated step 63. In addition, the seal of FIG. 5 includes the shroud 42 on the seal housing. The axially extended first region 58 throttles the high pressure across a radial transition region that is radially narrower than the transition region of FIG. 3. Accordingly, the aggregate force $F_o$ of FIG. 6 is less than the aggregate force $F_o$ of FIG. 3. As a result, the carbon ring 52 of FIG. 6 is less likely to separate from the seal seat 24 than is the carbon ring of FIG. 3.

Figure 7:
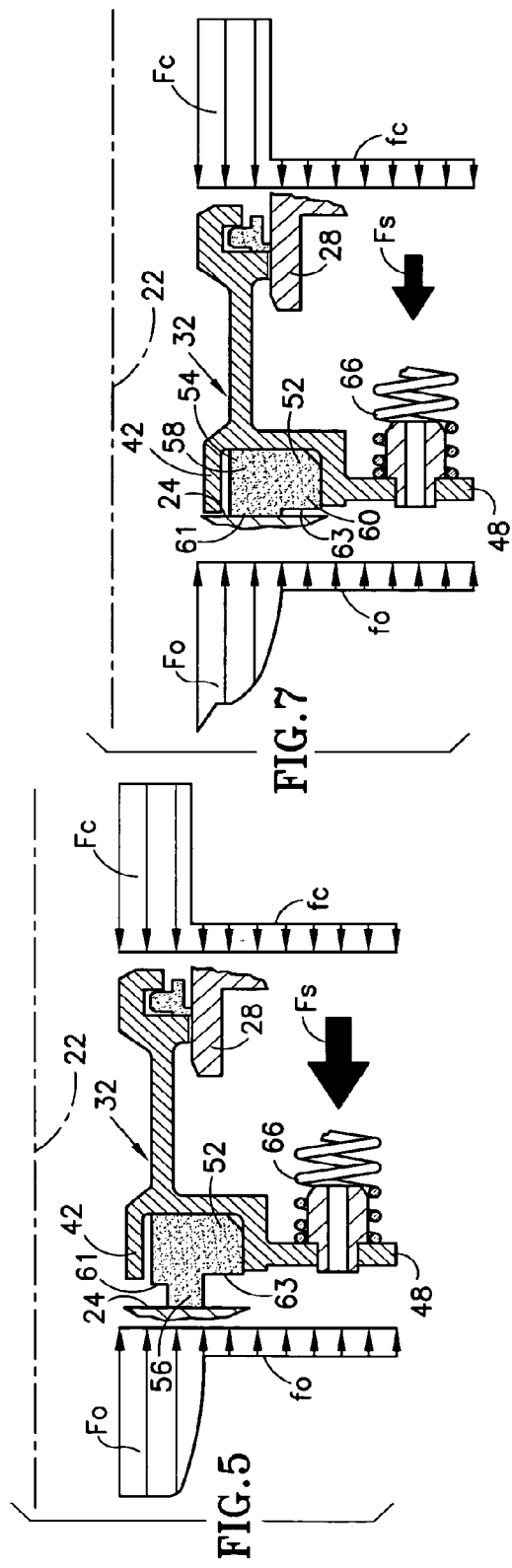

FIG. 7 shows the improved, shrouded seal in a more severely deteriorated condition. In comparison to FIG. 6, FIG. 7 shows the carbon ring 52 worn back essentially to the shroud 42 and therefore shows a throttling effect attributable to the shroud. The shroud and the axially extended first region 58 of the carbon ring throttle the high pressure across a radial transition region that is radially narrower than the transition region of FIG. 3. Accordingly, the force magnitude $F_o$ of FIG. 7 is less than the force magnitude $F_o$ of FIG. 3. As a result, the carbon ring of FIG. 7 is less likely than the carbon ring of FIG. 3 to separate from the seal seat 24 and permit leakage. As further wear of the carbon ring occurs, the shroud tip will eventually contact the seal seat 24 resulting in a more pronounced throttling effect.

Figure 8:
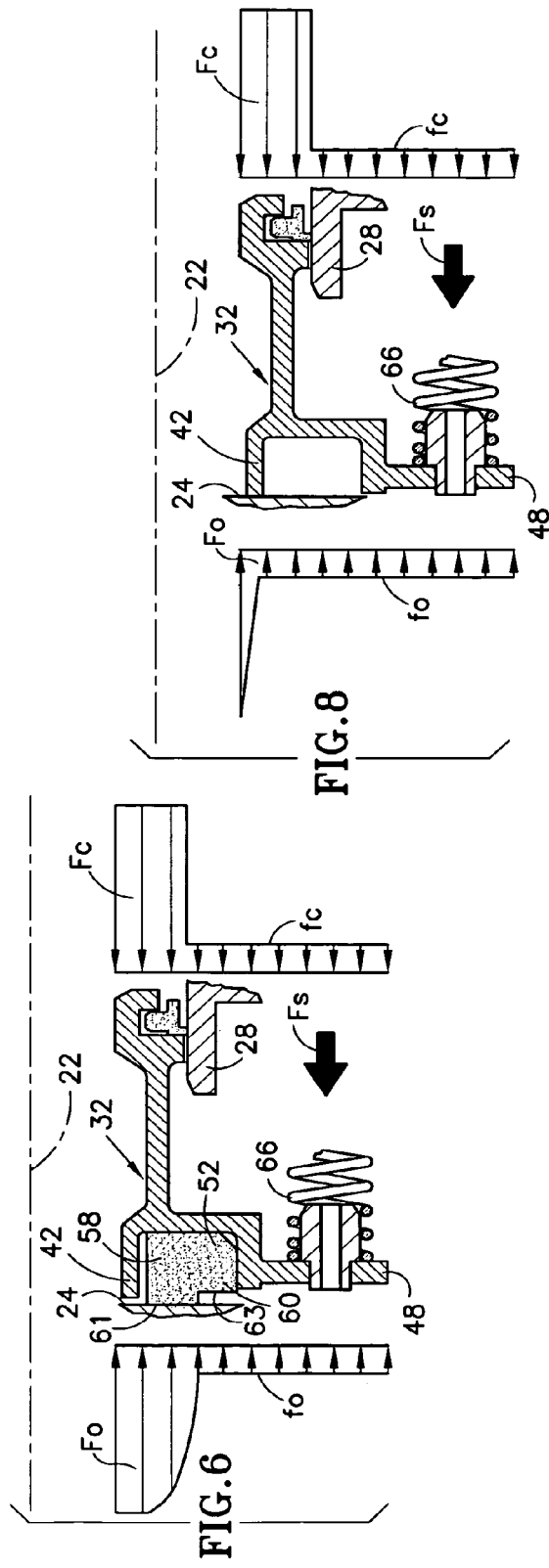

FIG. 8 shows the improved, shrouded seal in a damaged condition in which the carbon ring has been broken away over all or part of its circumference. The shroud 42 contacts the seal element and throttles the high pressure across a radially narrow transition so that the seal remains closed and resists leakage.

As is evident, the improved, shrouded seal deteriorates more gradually than a conventional unshrouded seal. The gradual deterioration is desirable because it manifests itself as noticeable but minor anomalies in engine performance. These minor anomalies make the engine operator aware that seal replacement or repair is required. Such replacement or repair may then be effected before the seal deteriorates enough to cause more significant problems.

With the construction and operation of the seal having now been described, certain variants may now be better appreciated.

FIG. 9 shows a seal like that of FIGS. 1 and 5-8 in which the housing 32 is made of a selected material. The shroud has a tip 74 at its axial extremity remote from the housing base 34. The tip is made of the same material as the rest of the housing.

FIG. 10 shows a seal in which the housing 32 is made of a parent material and the shroud has a tip 74 which is a region of the shroud impregnated with a second material. Alternatively, the shroud tip may be a feature made of or impregnated with a second material and bonded to the rest of the shroud or may be a coating. The second material may be any material having characteristics that are desirable when the tip contacts the seal seat 24. These include materials more lubricious than the parent material, materials harder than the parent material and materials more abradable than the parent material.

FIGS. 11-13 show a seal in which the shroud comprises a stem 76 and a tip in the form of an insert or attachment 78 affixed to the stem. In FIG. 11 the insert is affixed with a radially outer snap 82. In FIG. 12 the insert is affixed with a radially inner snap 84. In FIG. 13 the insert is a molded tip secured to the stem 76 through a set of circumferentially distributed countersunk holes 86. The tip insert may be made of a material having characteristics that are desirable when the tip contacts the seal ring 24. These include materials more lubricious than the parent material, materials harder than the parent material and materials more abradable than the parent material.

Although the improved seal has been shown and described with reference to specific embodiments thereof, it will be understood by those skilled in the art that various changes in form and detail may be made without departing from the invention as set forth in the accompanying claims.

We claim:

1. A face seal, comprising a seal seat and a seal element carried by a seal housing and cooperating with the seal seat to establish a seal, the housing including a seal element support and a shroud, wherein the seal housing is made of a parent material and the shroud has a tip impregnated with a second material, wherein the seal element includes a blank with a nose extending axially therefrom, the blank being stepped so that a first radial region extends axially beyond a second radial region of the blank, wherein the first and second radial regions define respective first ands second steps, and the tip is axially between the first and second steps.

2. The seal of claim 1 wherein the shroud is axially elongated relative to the support.

3. The seal of claim 2 wherein the seal element is a carbon ring.

4. The seal of claim 3 comprising exactly two steps.

5. The seal of claim 1 wherein the seal seat is a seal ring, and the seal element is a carbon ring residing radially between the support and the shroud.

6. The seal of claim 1 wherein the shroud is radially inboard of the support.

7. The seal of claim 1 wherein the seal housing is made of a material and the tip made of the same material.

8. The seal of claim 1 wherein the second material is selected from a group of materials consisting of: a) materials more lubricious than the parent material; b) materials harder than the parent material; and c) materials more abradable than the parent material.

9. The seal of claim 1 wherein the tip is a bonded tip, and the seal housing exclusive of the bonded tip is made of a parent material and the bonded tip comprises a second material different than the parent material.

10. The seal of claim 9 wherein the second material is selected from the group of materials consisting of: a) materials more lubricious than the parent material; b) materials harder than the parent material; and c) materials more abradable than the parent material.

11. The seal of claim 1 wherein the shroud is radial spaced from the seal element.

12. The seal of claim 1 wherein the tip is configured to contact the seal seat in the event that a portion of the seal element wears away.

13. A seal element for a face seal comprising: a blank configured to be held by seal housing, a nose extending from the blank toward a seal face in a given direction, a first region of the blank extending in the given direction beyond a second region of the blank, the entire first and entire second regions being on radially opposite sides of the nose, wherein the nose and the first region extend in the given direction past the seal housing, and the seal housing extends in the given direction past the second region, wherein the first region has an axially facing surface and the entire axially facing surface contacts an associated seal seat in the event that the nose wears away to resist separation of the seal element, wherein the seal housing and the axially facing surface are biased together in the same axial direction toward the associated seal seat.

14. A seal element for a face seal comprising: a blank configured to be held by seal housing, a nose extending from the blank toward a seal face in a given direction, a first region of the blank extending in the given direction beyond a second region of the blank, the entire first and entire second regions being on radially opposite sides of the nose, wherein the nose extends in the given direction past the first region to define a step past the seal housing, and the entire step contacts an associated seal seat in the event that the nose wears away to resist separation of the seal element, wherein the seal housing and the step are biased together in the same axial direction toward the associated seal seat.

15. The seal element of claim 14, wherein the seal housing comprises a parent material, and a shroud of the seal housing has a tip comprising a second material different than the parent material.

\* \* \* \* \*